(12) United States Patent
Tripunitara et al.

(10) Patent No.: US 6,771,649 B1
(45) Date of Patent: Aug. 3, 2004

(54) MIDDLE APPROACH TO ASYNCHRONOUS AND BACKWARD-COMPATIBLE DETECTION AND PREVENTION OF ARP CACHE POISONING

(75) Inventors: Mahesh V. Tripunitara, Merryville, IN (US); Partha Dutta, San Jose, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/454,732

(22) Filed: Dec. 6, 1999

(51) Int. Cl.[7] .................................. H04L 12/28
(52) U.S. Cl. ............... 370/395.54; 711/163; 713/154
(58) Field of Search .................... 370/254, 255, 370/389, 390, 392, 393, 395.1, 395.54, 412, 469, 471, 474, 475; 713/150–155, 160, 162–164, 200, 201; 380/255, 257

(56) References Cited

U.S. PATENT DOCUMENTS

| | | | |
|---|---|---|---|
| 5,224,166 A | * 6/1993 | Hartman, Jr. ............... | 713/190 |
| 5,229,988 A | 7/1993 | Marbaker et al. | |
| 5,309,437 A | * 5/1994 | Perlman et al. ............. | 370/401 |
| 5,473,771 A | * 12/1995 | Burd et al. .................. | 709/248 |
| 5,526,489 A | 6/1996 | Nilakantan et al. | |
| 5,668,952 A | 9/1997 | Slane | |
| 5,708,654 A | * 1/1998 | Arndt et al. ................ | 370/242 |
| 5,724,510 A | * 3/1998 | Arndt et al. ................ | 370/453 |
| 5,757,924 A | * 5/1998 | Friedman et al. ........... | 713/151 |
| 5,802,285 A | 9/1998 | Hirviniemi | |
| 5,812,767 A | 9/1998 | Desai et al. | |
| 5,872,847 A | 2/1999 | Boyle et al. | |
| 5,909,446 A | 6/1999 | Horikawa et al. | |
| 5,917,900 A | * 6/1999 | Allison et al. ............... | 370/401 |
| 5,978,854 A | * 11/1999 | Fujimori et al. ............ | 709/245 |
| 6,081,533 A | * 6/2000 | Laubach et al. ............ | 370/421 |
| 6,330,615 B1 | * 12/2001 | Gioquindo et al. ......... | 709/236 |

* cited by examiner

*Primary Examiner*—John Pezzlo
*Assistant Examiner*—David Odland

(57) ABSTRACT

A method and apparatus for a middleware approach to the asynchronous and backward-compatible detection and prevention of Address Resolution Protocol (ARP) cache poisoning is presented. In a Streams-based network subsystem, such as found in the Solaris 2.6 operating system, a Cache Poisoning Checker (CPC) streams module, a CPC streams driver and a CPC user-level application are implemented. The CPC streams module is implemented in a protocol stack that pertains to ARP and is designed to intercept ARP traffic in both the upward and downwards directions that are dictated by the respective Internet Protocol and Ethernet drivers in the network subsystem. The CPC streams driver acts to provide an interface between the CPC streams module and the CPC user-level application. The CPC user-level application gives access to the local ARP cache and raises alarms if an ARP cache attack is detected. Both the CPC streams driver and CPC user-level application are implemented in a stream of their own, separate from the protocol stack containing the CPC streams module.

14 Claims, 5 Drawing Sheets

FIG. 6

If a frame is received:
    If this is a response:
        If there is a corresponding entry in the requestedQ:
            Move the entry to respondedQ and let the frame flow up the Stream to be processed by the host's ARP implementation.
        Else, there is a corresponding entry in the respondedQ, and:
            If there is a corresponding entry in the respondedQ, then we have received a duplicate response so:
                Check the local ARP cache (via the application) for whether there is an entry for this IP address. If there is:
                    Check whether the entry in the ARP cache corresponding to the IP address is the same as that in the response. If yes:
                        Refresh the entry in the ARP cache
                  Else, the ARP cache entry is not consistent with the frame:
                      Raise an alarm and log the fact. Drop the frame. Flush the ARP cache of the entry corresponding to that IP address.
                Else, there is no entry in the ARP cache for this IP address, and:
                    Raise an alarm and log the fact. Drop the frame. The time-out value for entries in the responedQ is more than the time-out for entries in the ARP cache. The time-out value for entries in the respondedQ may need to be updated.
        Else, this is an unsolicited response. Drop it and log the fact.
    Else, this is a request, and:
        If this is a request for a resolution of this host's IP address:
            Send a response and drop the frame.
        Else, this is a request for resolving another host's IP address:
            Drop the Frame.
Else, a frame is being sent, and:
    If this is a response:
        Let the frame flow down.
    Else, this is a request, and:
        Add a corresponding entry in the requestQ. Let the frame flow down.

MIDDLE APPROACH TO ASYNCHRONOUS AND BACKWARD-COMPATIBLE DETECTION AND PREVENTION OF ARP CACHE POISONING

BACKGROUND OF THE INVENTION

1. Field of the Invention

The present invention relates to a method and apparatus for a middleware approach to asynchronous and backward-compatible detection and prevention of Address Resolution Protocol (ARP) cache poisoning, and more particularly, to a method and apparatus for implementing a cache poisoning checker module, driver and user-level application in a streams-based network subsystem to detect and prevent ARP cache poisoning.

2. Description of the Art

Address Resolution Protocol (ARP) cache poisoning is the act of a malicious host/server in the local area network (LAN), of introducing a spurious (i.e., false) Internet Protocol (IP) and/or Ethernet mapping address in another host's ARP cache. The effect of ARP cache poisoning is that network traffic intended for one host is diverted to a different host or to no host at all. ARP cache poisoning, and thus the diverting of messages from their intended recipients, can be accomplished by ARP "spoofing", that is attacking at a host/server's ARP cache the assigned addressing routes of the network. Accordingly, ARP spoofing is a serious concern to network managers and participants as ARP spoofing can be used to compromise network security.

There are four ways in which a host's ARP cache can be poisoned based on root address access in the LAN, that is during the processes of: receiving an address request; receiving an address response; sending an address request; and, sending an address response. As the protocol is stateless, that is, there is no built-in tracking or "memory" of address requests and/or responses, a malicious host can attack root addresses by any of these processes.

The first way to poison an ARP cache by spoofing is during the process of the receipt of an address request. As ARP implementations cache entries based on the requests they receive, an attacker only has to pretend to be sending out a legitimate address request to poison the ARP cache of the request host recipient. That is, if malicious host A sends out a broadcast ARP request packet for host B, host C might cache the mapping address information about host A based on the request host A has sent out.

The second way of ARP cache poisoning by spoofing is during the process of receiving an unsolicited address response. That is, an address response that is unsolicited (i.e., not associated with an address request) will be honored by an ARP implementation due to the fact it is stateless. Thus, a malicious host has only to independently send an address response ARP packet on the LAN with a spurious mapping address to poison the ARP cache of the response recipient. This unsolicited address response can be broadcast to poison the ARP cache of every host on the LAN.

Rather than send an unsolicited address response, or a spurious address request, a third way in which a host's ARP cache may be poisoned is by a malicious host waiting until the victim host issues an address request and then responding by sending a spurious address response to that request. In this case, if the host to which the address request was sent (i.e., the legitimate host) responds to that request, there is a race condition that the malicious host may win. In this case, it is the address response that is received later that will supercede the entry in the victim host's cache corresponding to the address response that is received earlier (i.e., it is overwritten).

A fourth way of ARP cache poisoning by spoofing is when a malicious host sends out both a spurious address request and a spurious address response corresponding to that address request. This may be used to poison a victim host's ARP cache in the case where a victim host has a partial solution to the poisoning problem and does in fact "remember" an address request: either it's own request or from another host, and only cache's a response to a "remembered" request.

Thus, as can be seen, ARP cache poisoning by root IP and Ethernet address attacks by spoofing can be done quite simply in a number of ways.

SUMMARY OF THE INVENTION

Accordingly, the present invention allows for a method and apparatus for detecting and preventing Address Resolution Protocol (ARP) cache poisoning having an implementation in middleware, without any access or change to any operating system source code, and which is asynchronous and backward compatible.

To detect and/or prevent ARP cache poisoning, a Cache Poisoning Checker (CPC) module is implemented in a stream stack pertaining to the ARP and is used to intercept messages containing Internet Protocol (IP) and/or Ethernet addresses traveling both upstream and downstream between servers in the network operating system. Furthermore, a CPC stream driver and CPC user-level application are implemented in a separate stream, the CPC driver providing an interface to and between the user-level application and the CPC module. Both the CPC stream module and the CPC user-level application utilize an algorithm in the prevention and detection of ARP poisoning.

In an embodiment, the present invention is disclosed utilizing as an example a Solaris 2.6 network operating system platform for an environment in which any number of hosts in a LAN communicate using a Transmission Control Protocol/Internet Protocol (TCP/IP) suite over a shared Ethernet.

The present invention, including its features and advantages, will become more apparent from the following detailed description with reference to the accompanying drawings.

BRIEF DESCRIPTION OF THE DRAWINGS

FIG. 6 illustrates an example of an algorithm which can be executed in the CPC module and application, according to an embodiment of the present invention.

DETAILED DESCRIPTION

FIGS. 1 through 6 illustrate a method and apparatus for detecting and preventing address resolution protocol (ARP) cache poisoning, which method and apparatus of the present invention are implemented so as to be asynchronous, backward-compatible and as a middleware solution. Thus the method and apparatus of the present invention does not require checking of ARP cache consistency every few units of time, protects the ARP caches of those hosts in the LAN which are so designated to be protected, and does not require any change to existing components of the network in that access to the source code of the ARP or other components is not necessary.

Figure 1:
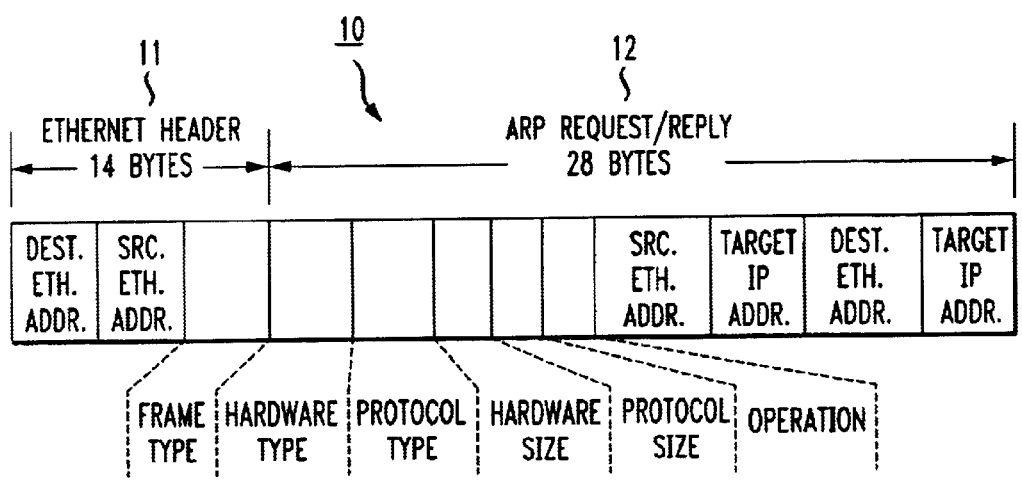
FIG. 1 illustrates an example of a format of an Address Resolution Protocol (ARP) frame for use on an Ethernet, according to the prior art.

Referring now to FIG. 1, the format of an ARP frame 10, according to the prior art, is shown. In a scenario where a number of hosts communicate over a local area network (LAN) using a Transmission Control Protocol/Internet Protocol (TCP/IP) suite over a shared Ethernet, IP packets need to be encapsulated in Ethernet frames before they can be transmitted. Hosts are identified at the IP layer with an IP address and at the Ethernet layer with an Ethernet address. Before an IP packet can be encapsulated in an Ethernet frame, however, the message sender needs the message recipients Ethernet address so that the Ethernet frame can be constructed. Assuming one to one mapping between the set of IP addresses and the set of Ethernet addresses for the LAN, hosts are uniquely identified both at the IP layer and at the Ethernet layer. Thus, an ARP frame 10 is constructed with a IP or Ethernet header 11 and an ARP request or reply message 12. Preferably, the IP or Ethernet header 11 is fourteen (14) bytes in length, while the ARP request or reply message 12 is twenty-eight (28) bytes in length. It is to be understood, of course, that the header and message are not to be limited to these lengths, and in fact may be whatever length is appropriate for the TCP/IP suite utilized in the network.

As ARP is a request/response protocol, an ARP request is broadcast on the LAN. This ARP request contains the source IP and Ethernet addresses and the target IP address. Given the destination IP address, ARP is used to find the Ethernet address corresponding to that IP address. Each host on the LAN checks the target IP address in a request against its own IP address. If a host is configured with the target IP address, it sends an ARP response with its Ethernet address. The response is uni-cast, that is, it is only addressed to the sender of the message request. It is to be understood, that a proxy ARP may be employed in situations in which it is desirable to have an ARP proxy server respond to all or some resolution requests. That is, the proxy server responds on behalf of the target host.

Figure 2:
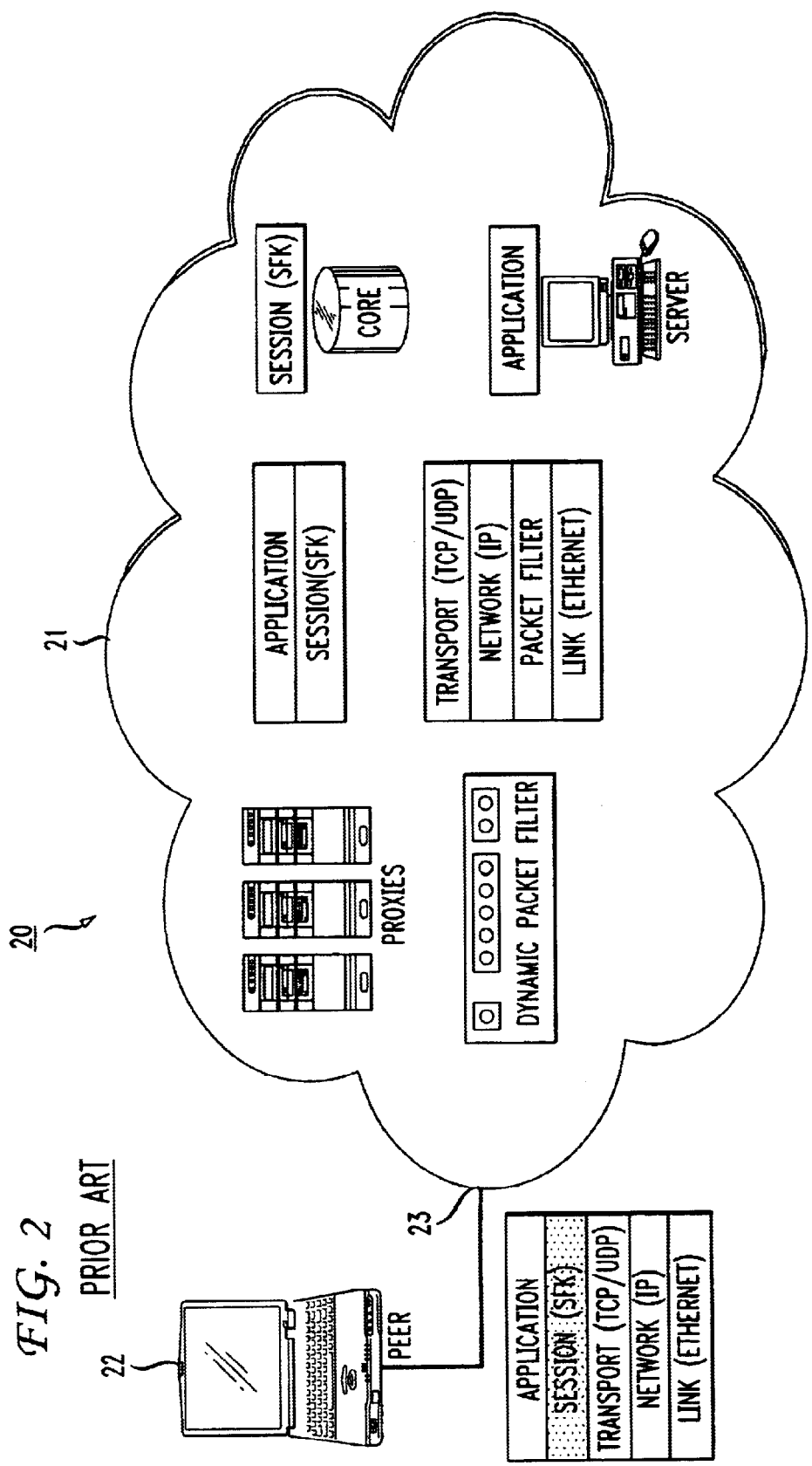
FIG. 2 illustrates the architectures of a network operating system Common Open IP Platform (COIPP) and its components, according to the prior art.

Referring now to FIG. 2, an architectural scheme of the Common Open IP Platform 20 (COIPP), according to the prior art, is shown. The COIPP is a network operating system in which a network cloud 21 is used for communication between a number of hosts 22. A host is either a client, a server, or both, and thus is a "user" that "logs into" the cloud 21 and uses services exported by the cloud 21 and by other hosts 22. The network cloud 21 provides functionality that does not have to be available at the host 22, such as authentication, access control and usage recording. At the edges of the network cloud 21 are gates 23. The gate 23 is a bastion to the cloud and its ARP cache needs to be protected. Unfortunately, however, hosts 22 run only "standard" software (e.g., such as a web browser) and therefore nothing can be changed in them. These design constraints are not unique to the COIPP architecture. In any situation in which the ARP caches of only select machines on a LAN need to be protected, these constraints are appropriate. Furthermore, no changes are necessary in any of the other hosts.

Figure 3:
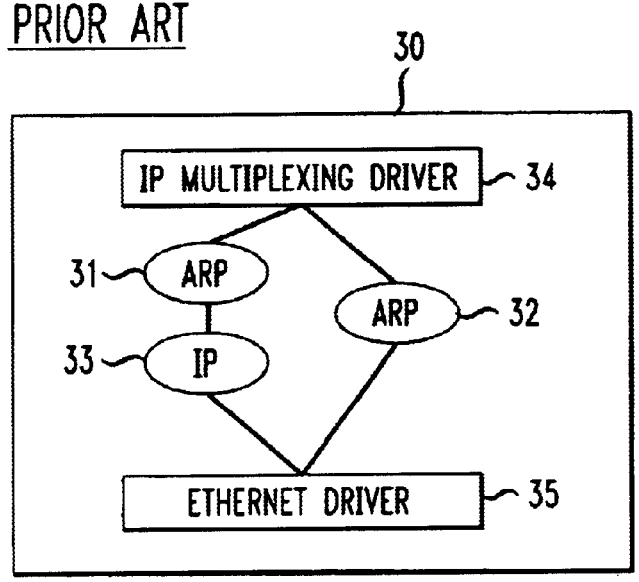
FIG. 3 illustrates a portion of a protocol stack pertaining to an ARP in a network operating system platform, according to the prior art.

Referring now to FIG. 3, a portion of a protocol stack 30 that pertains to ARP, according to the prior art, is shown. Such a protocol stack 30 is deployed in a streams-based networking subsystem that operates within the COIPP and utilizes the ARP frame format. A streams-based networking subsystem is a paradigm that prescribes modularity. That is, modules can be created that implement some functionality and can be selected and interconnected without any kernel reprogramming or linking. Drivers act as interfaces between a device (possibly virtual) and the kernel. The Solaris 2.6 network operating system platform is an example of an operating system that uses such a streams-based networking subsystem.

Part of the functionality associated with each of the ARP and IP is implemented using streams modules. Streams modules and drivers are organized as a stack, with a stream head on top, any number of modules beneath the head, and a driver at the bottom. Thus, in the figure, two ARP streams modules are represented by ovals 31 and 32 and an IP streams module is represented by oval 33. An IP Multiplexing stream driver is represented by rectangle 34, while an Ethernet stream driver is represented by rectangle 35. The ARP module 31 is pushed above the IP module 33 for the IP module 33 to be able to make resolutions based on the local ARP cache. All ARP traffic from and to the network flows on the "branch" on which there is only the ARP module 32 below the IP Multiplexing stream driver 34. Data is transferred using units called message blocks and a messaging queue is associated with each of the upward and downward directions in which the message blocks flow.

Figure 4:
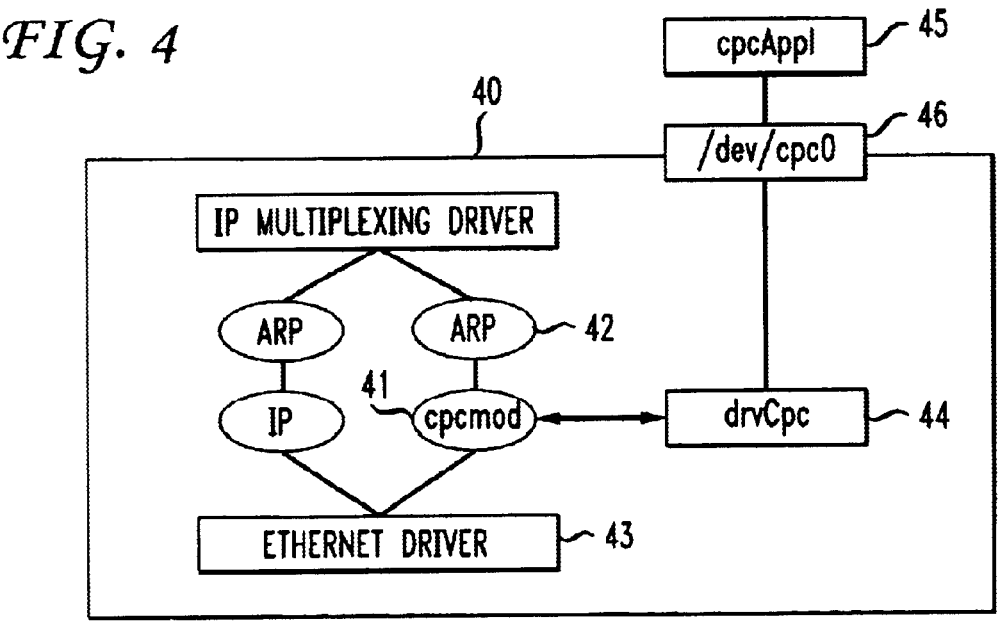
FIG. 4 illustrates a modified protocol stack in a network operating system platform, according to an embodiment of the present invention.

Referring now to FIG. 4, a modified protocol stack 40, in a network operating system such as the Solaris 2.6 operating system, according to an embodiment of the present invention, is shown. In the modified protocol stack 40, a cache poisoning checker (CPC) module 41 is inserted between an ARP streams module 42 and an Ethernet streams driver 43. The CPC module 41 intercepts ARP traffic in both the upward and downward directions. Thus, the four ways in which a ARP cache may be poisoned as mentioned previously above (i.e., that is: receiving a request, receiving a response, sending a request, and sending a response), are of potential interests to us.

Traffic in the upward direction can be checked for whether it will poison the cache. If a decision is made that the ARP traffic should not be allowed through, that is enforced. Traffic in the upward direction could be either an ARP request or response. Traffic in the downward direction is ARP responses from the host 22. This traffic is used to record what requests have gone out of the host, so responses may be matched to the requests. To do so, the CPC module 41 maintains two queues of IP addresses called "Requested Q" and "Responded Q." As there are separate queues for upward and downward flowing traffic, requests sent from the local host can be differentiated from requests sent by a malicious host pretending to be the local host.

Furthermore, a CPC driver 44 is used to provide an interface between the CPC module 41 and a user level application 45. A CPC device 46 provides an interface between the user level application 45 and the CPC driver 44. The application 45 performs an "open ( )" command on the device 46 and then communicates with the driver 44 using "ioctl ( )" to send messages to the driver 44, and "get message ( )" to receive messages from the driver 44. The module 41 and driver 44 communicate with each other using function calls.

The CPC application 45 is used for two reasons: To have access to the local ARP cache, and to raise alarms if an attack is detected. While the COIPP has its own management and monitoring system in the cloud 21 to raise such alarms, alarms can also be raised through the CPC application using a system log facility. It is to be further noted that the driver 44 and the application 45 are on a stream of their own, and that stream does not have modules between the stream head and the driver.

As such, no kernel reboot is required to "plum" the solution into the stream in the kernel. If the host in which the solution is deployed has multiple interfaces, each interface has a streams module plummed in, but the host only has a single driver and application.

It is to be understood, of course, that while the Solaris 2.6 operating system has been utilized as an example of a COIPP upon which the modified protocol stack 40 of the present invention is implemented, other platforms can be utilized as well, including ones that do not use the streams paradigm for their networking subsystem. For instance, a kernel device driver could be written to realize a functionality in a streams module in a non-streams environment.

Figure 5:
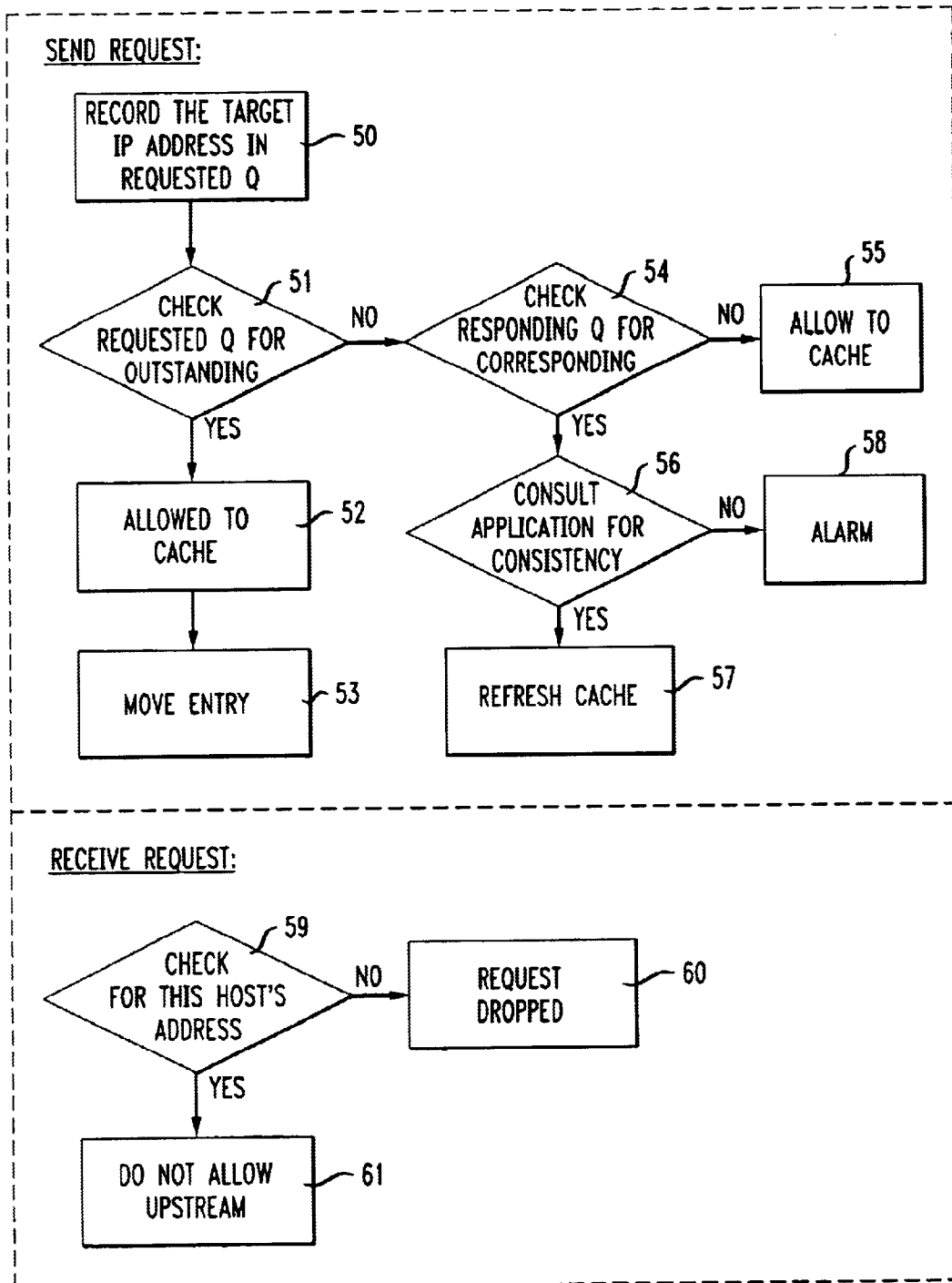
FIG. 5 illustrates a flow chart of a heuristic solution employed in the CPC module and application, according to an embodiment of the present invention.

Referring now to FIG. 5, a flow chart of a heuristic solution employed in the CPC module and application, according to an embodiment of the present invention, is shown. The heuristic solution provides a method for checking both requests and responses. Thus, in step 50, when a host sends out an ARP request, the ARP request is remembered by recording the target IP address in the Requested Q. In step 51, when a response is received by the host, the Requested Q is checked for whether a request for that IP address is outstanding. If a request is outstanding, in step 52, the response frame is allowed to flow up the stream so it can be cached in the host ARP cache. Then in step 53 the entry corresponding to the request is moved from the Requested Q to the Respondent Q.

If, however, there is no entry in the Requested Q corresponding to the response, in step 54 the Responded Q is checked for a corresponding entry. If no corresponding entry exists in the Responded Q, in step 55 the response frame is prevented from flowing up the stream to the host ARP cache since it is an unsolicited ARP response. If a corresponding entry does exist in the Responded Q, in step 56 the response is characterized as a duplicate and the application is consulted via the driver for whether the response is consistent with the entry already in the cache. If it is consistent, in step 57 the entry in the cache is refreshed. If it is not consistent, in step 58 an alarm is raised and the entry for that IP address is flushed. Thus, the characterization of whether a response is unsolicited or a duplicate is based on whether a request corresponding to that response in the Responded Q or not.

Alternatively, when a request is received, in step 59 the request is checked for whether it is a request for this host Ethernet address. If it is not, in step 60 the request is dropped. If it is, in step 61 the streams module responds to the request and does not allow the request to flow up the stream. Thus, a policy that information from requests is not cached is enforced and only information from responses to requests from this host are cached.

The size of the Requested Q plus the Responded Q is fixed. When an entry needs to be added to the Requested Q, the oldest entry in the Responded Q is overwritten with the new request information and moved to the Requested Q. If the Responded Q is empty, the oldest entry in the Requested Q is overwritten with the new information and becomes the newest entry in the queue.

Referring now to FIG. 6 an example of an algorithm which can be executed in the CPC module 41 and the CPC user-level application 45, according to an embodiment of the present invention, is shown. The algorithm allows the CPC module and CPC user-level application to check and prevent ARP cache poisoning.

Two special cases which the above algorithm does not address are gratuitous ARP and the use of an ARP (proxy) server. Gratuitous ARP is used by a host to find out if another host on the LAN has also been assigned its IP address. A situation in which this is useful is when a dynamic host configuration protocol (DHCP) is used for a dynamic IP address assignment. When a host gets an IP address from the DHCP server, it sends out a gratuitous ARP frame. A gratuitous ARP frame is an ARP request that has an IP address as both the source and target IP addresses in the frame and the host's Ethernet address as the source Ethernet address. The frame is broadcast just like any other ARP request. The expectation is that a host that has the same IP address will respond to the request, and thus the two hosts know that they are using the same IP address.

When the CPC module receives a gratuitous ARP frame, it checks for whether the IP address corresponds to the IP address of the host. If it does, the frame is allowed to flow up the Stream. It if does not, the frame is dropped. This is done so that a spurious gratuitous ARP frame is not allowed to poison the host's ARP cache.

Alternatively, some LANs use a proxy ARP server to respond to ARP requests for the Ethernet addresses of some hosts. The host in which the present invention is deployed in can act as proxy server with only slight modifications. If some of the other hosts in the LAN use such a proxy server to give out their Ethernet address information, that does not adversely affect the solution. Rather, the responses from such a server have the source address, in the Ethernet frame that the ARP frame is encapsulated in, as the server's address. But the source address in the ARP frame is the address of the host for which the proxying is being performed.

Thus, a method and apparatus for the detection and prevention of ARP cache poisoning which is asynchronous, backward-compatible and a middleware approach is achieved. In this manner then, the ARP cache consistency does not require checking every few units of time, and the ARP cache of those hosts which are so designated can be protected. Furthermore, there is no requirement for any change in the existing source code of the components in the network.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. An apparatus for detecting attempts to poison and preventing poisoning of an Address Resolution Protocol (ARP) cache, the apparatus comprising:

a streams-based networking subsystem;

a protocol stack, implemented in the streams-based networking subsystem, comprising:

an ARP streams module capable of making resolution based upon the ARP cache; and a cache poisoning checker module for intercepting ARP traffic to and from the ARP streams module, the cache poisoning checker module adapted to record a destination Internet Protocol address for a second host contained in an ARP request from a first host, and determine whether an Internet Protocol address contained in the ARP response from the second host corresponds to the recorded destination Internet Protocol address for the second host, wherein the cache poisoning checker module can detect a spurious ARP response and prevent it from being entered in the ARP cache if the Internet Protocol address contained in the ARP response from the second host does not correspond to the recorded destination Internet Protocol address of the second host in the ARP request from the first host.

2. The apparatus according to claim 1, further comprising:

a cache poisoning checker user-level application which provides access to the ARP cache and allows an ARP cache attack alarm to be raised; and a cache poisoning checker driver which provides an interface between the cache poisoning checker user-level application and the cache poisoning checker module.

3. The apparatus according to claim 2, further comprising:

a cache poisoning checker device which provides an interface between the cache poisoning checker user-level application and the cache poisoning checker driver.

4. The apparatus according to claim 1, wherein the cache poisoning checker module maintains two queues of Internet Protocol addresses, one pertaining to ARP requests and one pertaining to ARP responses.

5. The apparatus according to claim 2, wherein the ARP cache attack alarm is raised using a system log facility.

6. An apparatus for detecting attempts to poison and preventing poisoning of an Address Resolution Protocol (ARP) cache, the apparatus comprising:

a network operating system; and a module, implemented within the network operating system, which checks an Internet Protocol or Ethernet header of an ARP frame to determine if the ARP frame contains a spurious Internet Protocol or Ethernet address, the module adapted to record a destination Internet Protocol address for a second host contained in an ARP request from a first host; and determine whether an Internet Protocol address contained in the ARP response from the second host corresponds to the recorded destination Internet Protocol address for the second host, wherein, if the Internet Protocol address contained in the ARP response from the second host does not correspond to the recorded destination Internet Protocol address of the second host in the ARP request from the first host, the ARP frame is not allowed to the ARP cache.

7. The apparatus according to claim 6, further comprising:

a user-level application to which an alarm relating to the spurious Internet Protocol or Ethernet address can be sent by the module.

8. The apparatus according to claim 7, further comprising:

an interface between the user-level application and the module.

9. The apparatus according to claim 6, wherein the network operating system is a Common Open Internet Protocol Platform.

10. A method of detecting attempts to poison and preventing poisoning of an Address Resolution Protocol (ARP) cache, the method comprising:

recording a destination Internet Protocol address for a second host contained in an ARP request from a first host;

determining, upon receipt of an ARP response, whether an Internet Protocol address contained in the ARP response from the second host corresponds to the recorded destination Internet Protocol address for the second host, wherein, if the Internet Protocol address contained in the ARP response from the second host does not correspond to the recorded destination Internet Protocol address of the second host in the ARP request from the first host, the Internet Protocol address of the ARP response is not allowed to flow to the ARP cache.

11. The method according to claim 10, further comprising the step of:

raising an alarm upon a determination that the Internet Protocol address contained in the ARP response does not correspond to the recorded destination Internet Protocol address of the ARP request.

12. The method according to claim 10, wherein the destination Internet Protocol address is recorded in a queue.

13. The method according to claim 10, wherein if the Internet Protocol address contained in the ARP response does correspond to the recorded destination Internet Protocol address of the ARP request, the Internet Protocol address of the ARP response is allowed to flow to the ARP cache.

14. The method according to claim 13, wherein the ARP cache is refreshed.

* * * * *